United States Patent
Rhiger et al.

(10) Patent No.: US 9,910,168 B2
(45) Date of Patent: Mar. 6, 2018

(54) COMBINED NEUTRON AND GAMMA-RAY DETECTOR AND METHOD

(71) Applicant: Raytheon Company, Waltham, MA (US)

(72) Inventors: David R. Rhiger, Santa Barbara, CA (US); Kelly A. Jones, Goleta, CA (US)

(73) Assignee: RAYTHEON COMPANY, Waltham, MA (US)

( * ) Notice: Subject to any disclaimer, the term of this patent is extended or adjusted under 35 U.S.C. 154(b) by 605 days.

(21) Appl. No.: 14/270,005

(22) Filed: May 5, 2014

(65) Prior Publication Data
US 2015/0316662 A1 Nov. 5, 2015

(51) Int. Cl.
*G01T 1/24* (2006.01)
*G01T 3/08* (2006.01)
*G01T 7/00* (2006.01)

(52) U.S. Cl.
CPC .............. *G01T 1/247* (2013.01); *G01T 1/241* (2013.01); *G01T 3/08* (2013.01); *G01T 7/00* (2013.01)

(58) Field of Classification Search
CPC ..................................................... G01T 1/247
See application file for complete search history.

(56) References Cited

U.S. PATENT DOCUMENTS

| 3,988,586 | A | 10/1976 | Stuart et al. |
| 5,969,359 | A | 10/1999 | Ruddy et al. |
| 6,218,668 | B1 | 4/2001 | Luke |
| 6,420,710 | B1 * | 7/2002 | Verger ................ G01T 1/247 250/370.06 |
| 7,164,138 | B2 | 1/2007 | McGregor et al. |
| 7,271,395 | B2 | 9/2007 | DeGeronimo |

(Continued)

FOREIGN PATENT DOCUMENTS

| CA | 1044821 | 12/1978 |
| EP | 1739460 A2 | 3/2007 |

(Continued)

OTHER PUBLICATIONS

Anderson, Stephen E., "Event Classification for 3-D Position Sensitive Semiconductor Detectors", dissertation, The University of Michigan, 2011.

(Continued)

*Primary Examiner* — David Porta
*Assistant Examiner* — Jeremy S Valentiner
(74) *Attorney, Agent, or Firm* — Renner, Otto, Boisselle & Sklar, LLP.

(57) ABSTRACT

A method for detecting both gamma-ray events and neutron events with a common detector, where the detector includes a layer of semiconductor material bounded by electrodes, and the electrodes include an anode on one side of the semiconductor material and a cathode on the other side of the semiconductor material, includes the following steps: (a) monitoring the electrical signal at each of the anode and the cathode; and (b) comparing the magnitude of the signals at the anode and the cathode, and the transit time difference between the start of the anode signal and the time when the anode signal reaches a maximum, relatively constant value. In the comparing step, predetermined criteria are used to differentiate between gamma-ray events and neutron events.

14 Claims, 3 Drawing Sheets

(56) References Cited

U.S. PATENT DOCUMENTS

| | | |
|---|---|---|
| 7,411,197 B2 | 8/2008 | He et al. |
| 7,626,178 B2 | 12/2009 | Ivan et al. |
| 7,855,372 B2 | 12/2010 | McGregor et al. |
| 8,389,941 B2 | 3/2013 | Bendahan et al. |
| 2005/0258372 A1* | 11/2005 | McGregor ............. G01T 1/185 250/390.01 |
| 2008/0203514 A1* | 8/2008 | Szeles ............... H01L 27/14658 257/442 |
| 2010/0213380 A1* | 8/2010 | Kub .......................... G01T 3/08 250/370.05 |
| 2010/0327170 A1* | 12/2010 | Ivan ........................ G01T 3/085 250/370.05 |
| 2011/0204243 A1 | 8/2011 | Bendahan et al. |
| 2011/0226958 A1* | 9/2011 | Feller ....................... G01T 3/00 250/391 |
| 2011/0233420 A1* | 9/2011 | Feller ....................... G01T 3/00 250/391 |
| 2011/0286576 A1* | 11/2011 | Cui ........................ A61B 1/051 378/62 |
| 2012/0132819 A1* | 5/2012 | Climent ................... G01T 3/08 250/370.05 |
| 2013/0134317 A1* | 5/2013 | Fauler .................... G01T 1/241 250/371 |
| 2014/0077087 A1* | 3/2014 | Chappell .................. G01T 1/28 250/370.05 |
| 2014/0264057 A1* | 9/2014 | Cress ....................... G01T 3/06 250/390.11 |

FOREIGN PATENT DOCUMENTS

| | | |
|---|---|---|
| WO | 2006048871 A1 | 5/2006 |
| WO | 2013116241 A1 | 8/2013 |
| WO | 2013122652 A2 | 8/2013 |

OTHER PUBLICATIONS

He et al., "Position-sensitive single carrier CdZnTe detectors", Nuclear Instruments and Methods in Physics Research, pp. 180-185, The University of Michigan, Dec. 27, 1996.

Radeka, Veljko, "Low-Noise Techniques in Detectors", Ann. Rev. Nucl. Part. Sci., vol. 38, pp. 217-277, Upton, New York 1988.

Cavalleri et al., "Extension of Ramo's Theorem as Applied to Induced Charge in Semiconductor Detectors", Nuclear Instruments and Methods, vol. 92, pp. 137-140, North-Holland Publishing Co., 1971.

Shockley, W., "Currents to Conductors Induced by a Moving Point Charge", vol. 9, pp. 635-636, Bell Telephone Laboratories, Inc., New York, NY, Oct. 1938.

Ramo, Simon, "Currents Induced by Electron Motion", Proceedings of the I.R.E., pp. 584-585, Sep. 1939.

Barrett, H.H. et al., "Charge Transport in Arrays of Semiconductor Gamma-Ray Detectors", Physical Review Letters, vol. 75, No. 1, pp. 156-159, The American Physical Society, Department of Radiology and Optical Sciences Center, University of Arizona, Tucson, Arizona, Dec. 27, 1994.

* cited by examiner

COMBINED NEUTRON AND GAMMA-RAY DETECTOR AND METHOD

FIELD OF THE INVENTION

The invention concerns a detector for neutrons and a detector for gamma rays and a corresponding method.

BACKGROUND

Radiation detectors have many important uses in nuclear energy, physics research, materials science, and radiation safety, among others. Two types of radiation often of interest include neutrons and gamma rays.

One way to detect these types of radiation uses a scintillator material called CLYC (which is Cs2LiYCl6:Ce3+), typically in the form of a crystal. Like other scintillators, a CLYC crystal produces a flash of light when capturing a gamma ray. The flash of light can be turned into an electrical signal for further analysis. A CLYC scintillator crystal also can be used to capture neutrons through a nuclear reaction with lithium (Li) atoms in the crystal, and also produces a flash of light due to the energetic particles from the neutron-lithium reaction. Unfortunately, these crystals can be difficult to grow and thus are quite expensive.

Another way to detect these types of radiation relies on the capture of neutrons by cadmium (Cd) in crystals of cadmium-zinc-telluride (CdZnTe) (often abbreviated CZT). CZT also is used in detectors for gamma-ray radiation. The neutron-cadmium reaction produces gamma rays that would be detected by pulses of electrons from the CZT, but the sensitivity is low and it is difficult to distinguish whether the pulse of electrons was caused by a neutron or a gamma ray.

SUMMARY

The present invention provides a combined neutron and gamma-ray detector and method that is sensitive to both neutrons and gamma-rays in the same semiconductor chip, is able to distinguish between the two kinds of radiation, and is compact, requires relatively little power, and is relatively inexpensive compared to current radiation detection devices and methods.

More specifically, the present invention provides a method for detecting both gamma-ray events and neutron events with a common detector, where the detector includes a layer of semiconductor material bounded by electrodes, including an anode on one side of the semiconductor material and a cathode on the other side of the semiconductor material. The method includes the steps of (a) monitoring the electrical signal at each of the anode and the cathode; and (b) comparing both the magnitude of the signals at the anode and the cathode, and a transit time difference between a start of the anode signal and a time when the anode signal reaches a relatively constant value, to differentiate between gamma-ray events and neutron events based on predetermined criteria.

The comparing step may include using the magnitude of the cathode signal to measure the depth of the gamma-ray event or of the neutron event in the semiconductor material.

The comparing step may include comparing the magnitude of the signal at the anode when it reaches a relatively constant value to a predetermined value.

The comparing step may include calculating a signal amplitude ratio of the magnitude of the cathode signal to the magnitude of the anode signal, and comparing the signal amplitude ratio to a predetermined value.

The method may further include the step of applying an electric field across the semiconductor material.

The method may further include the step of providing a common gamma-ray and neutron detector having a room-temperature semiconductor material bounded by an anode and an cathode, and a controller connected to the anode and the cathode, the controller including a processor and a memory.

The comparing step may include comparing the magnitude of the signal at the cathode to a predetermined value representing a depth of a neutron-capturing material in one or more trenches in a face of the semiconductor material.

The monitoring step may include monitoring without added cooling.

The present invention also provides a common room-temperature device for detecting both gamma rays and neutrons that includes an anode; a cathode; a processor connected to the anode and the cathode; and a semiconductor layer interposed between the anode and the cathode. The semiconductor layer includes a semiconductor material suitable for capturing gamma-ray events, the semiconductor material having generally parallel planar faces and a plurality of trenches in one of the planar faces adjacent to and between segments of one of the cathode and the anode, and the trenches containing a material suitable for capturing neutron events. The processor is configured to cooperate with the anode and the cathode to apply an electric field across the semiconductor layer; and the processor is configured to differentiate between signals generated by a neutron event and signals generated by a gamma-ray event as a function of a transit time and a magnitude of signals received from each of the anode and the cathode.

The processor may include an analog-to-digital signal processor.

The semiconductor material may include crystallized cadmium-zinc-telluride (CdZnTe).

The neutron-capturing material may include lithium fluoride.

The semiconductor material may have a thickness of about 2000 μm, and the trenches have a depth of about 50 μm, a width of about 20 μm and a spacing of about 20 μm.

The cathode may be disposed adjacent both the semiconductor material and the neutron-capturing material, and the anode may be disposed adjacent only the semiconductor material.

The device may further include a passivation layer disposed in the trenches separating the semiconductor material from the neutron-capturing material.

The passivation layer may be a layer of oxidized crystallized cadmium-zinc-telluride (CdZnTe).

The anode may include interdigitated grids of coplanarly arranged anode material.

The present invention also provides a controller for use with a common room-temperature device for detecting both gamma rays and neutrons. The device has an anode, a cathode, and a semiconductor layer interposed between the anode and the cathode, the semiconductor layer including a semiconductor material suitable for capturing gamma-ray events. The semiconductor material has a plurality of trenches in one face of the semiconductor material adjacent to and between segments of one of the cathode and the anode, and the trenches contain a material suitable for capturing neutron events. The controller includes a processor configured to cooperate with the anode and the cathode to apply an electric field across the semiconductor layer; and the processor is configured to differentiate between signals generated by a neutron event and signals generated by a gamma-ray event as a function of a transit time and a magnitude of signals received from each of the anode and the cathode.

Further, the present invention provides a device for detecting both gamma rays and neutrons that includes a semiconductor layer made of a material for capturing gamma rays; an anode attached to a first side of the semiconductor layer; a cathode attached to a second side of the semiconductor layer, the second side disposed opposite the first side; segments of a neutron-capturing material for capturing neutrons disposed on the second side of the semiconductor layer; and a processor configured to apply an electric field between the anode and cathode and to differentiate between signals generated by gamma-rays and signals generated by neutrons.

The processor may be configured to differentiate between signals generated by a neutron event and signals generated by a gamma-ray event as a function of a transit time and a magnitude of signals received from each of the anode and the cathode.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

As noted above, the present invention provides a combined neutron and gamma-ray detector and method that is sensitive to both neutrons and gamma-rays in the same semiconductor chip, is able to distinguish between the two kinds of radiation, and is compact, requires relatively little power, and is relatively inexpensive compared to current radiation detection devices and methods.

Figure 1:
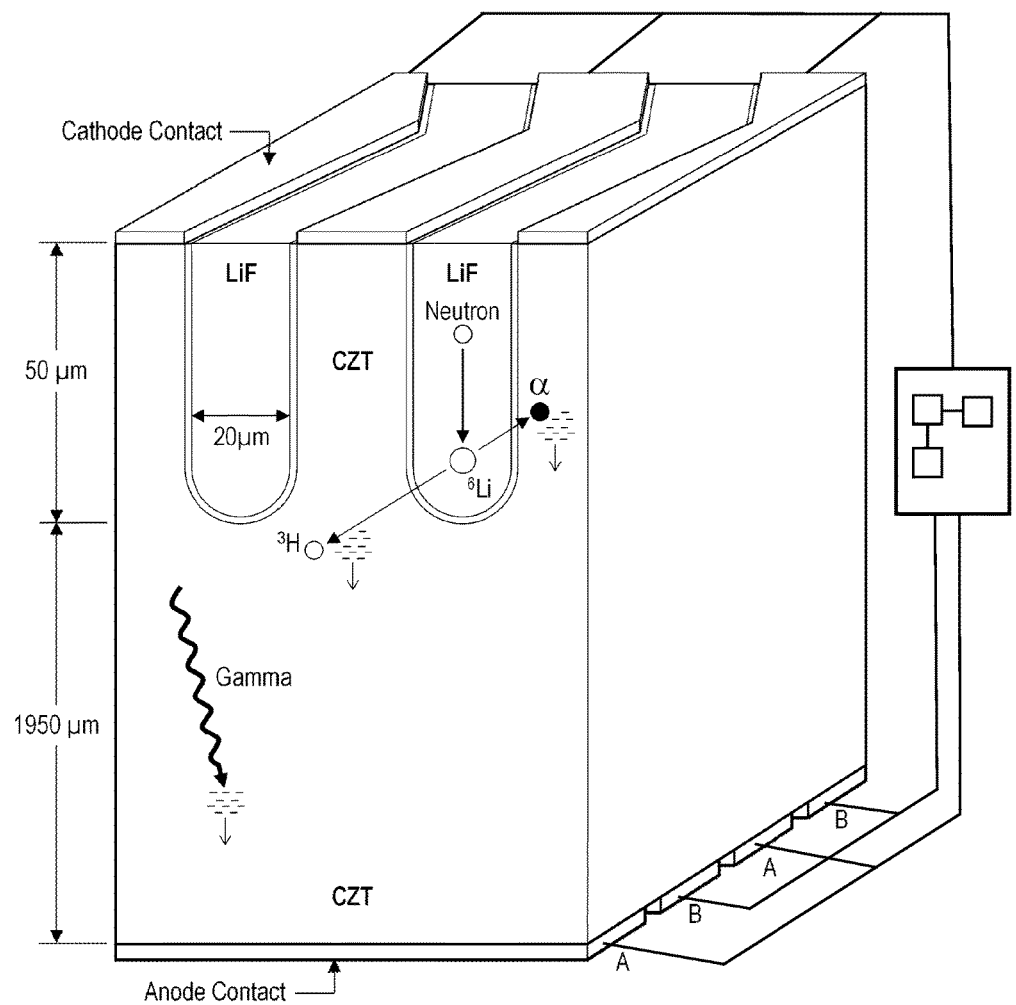
FIG. 1 is a schematic cross-section of a combined neutron and gamma-ray detector provided by the invention.

Referring now to the drawings in detail, FIG. 1 shows an exemplary detector structure that is sensitive to both neutrons and gamma rays. The detector includes a semiconductor chip, a cross-section of which is shown in FIG. 1. The semiconductor chip has a main body that includes a layer of a gamma-ray detector material, such as crystallized cadmium-zinc-telluride (CdZnTe) (referred to here as CZT), which is available from eV Microelectronics of Saxonburg, Pa., U.S.A., for example. Other semiconductor materials can be used for the main body, including high-resistivity gallium arsenide (GaAs) and high purity germanium (HPGe). In an exemplary embodiment, the main body of the detector chip is approximately 2000 µm (0.2 cm) thick. In this example, the total volume of CZT is about 0.2 cm$^3$ to minimize the cost. The semiconductor chip has generally flat, parallel faces, with one face being modified to provide improved neutron sensitivity.

The modified face has one or more trenches filled with a material suitable for capturing neutrons, such as lithium fluoride (LiF) enriched in 6Li. The enriched lithium fluoride can better take advantage of the large energy and long penetration of triton particles, which are produced upon impact of a neutron. The impact, or capture, of a neutron in the neutron-capturing material is referred to as a neutron event. An alternative neutron-capturing material includes boron (B) enriched with 10B.

An exemplary trench is about 50 µm deep and about 20 µm wide. The 50-µm/20-µm aspect ratio and dimensions of the trenches are well within the capabilities of existing dry (or dry+wet) etch processes routinely used for etching mercury-cadmium-telluride (HgCdTe) materials, and these etch processes are applicable to CZT as well. When the etched face of FIG. 1 is viewed from above, the trenches appear to follow a zigzag pattern, which improves the detector's efficiency by allowing triton particles initially traveling parallel to the trench wall following a neutron event to escape and enter the CZT.

A very thin passivation layer is provided between the LiF and CZT to minimize or prevent migration of molecules across the boundary between the LiF and the CZT, but it is not necessary for operation of the detector. The passivation layer can be formed by oxidizing the surface of the CZT exposed in the trench before filling the trench with the LiF.

The main body of the detector chip and the trenches form a generally planar structure with parallel opposing faces to which respective electrodes are mounted. The electrodes include a cathode and an anode applied to the opposing faces of the main body to apply an electric field, and generate a voltage drop across the CZT. In the illustrated embodiment, the cathode is formed of strips of metal that contact portions of the face of the semiconductor material between the trenches. An exemplary anode, partially shown, consists of two coplanar grids of metallic strips, which we can call grid A and grid B, applied to the face opposite the cathode.

The electrodes, the anode and the cathode, are connected to a controller. The controller controls the application of the electric field to the semiconductor material through the anode and the cathode. The controller also receives and analyzes electrical signals received at the anode and the cathode. An exemplary controller includes a processor or Central Processing Unit (CPU), together with an associated memory for storing an operating system, application software, and data generated by radiation events in the detector. The processor also may include an analog-to-digital converter (ADC), and can be connected to input and output devices in a well known manner.

Unlike some prior radiation detectors, the detector structure just described requires no added cooling, and can operate at ambient temperature, sometimes referred to as room temperature. Additionally, the power requirements are very low, including only the power necessary to generate the electric field across the semiconductor layer and the power to the processor for analyzing the signals received at the anode and the cathode. While a gamma-ray-capturing semiconductor material and a neutron-capturing material in a trench in the semiconductor material work well, alternative shapes can be employed other than the generally planar, layered structure of cathode-semiconductor chip-anode just described.

In operation, energetic or thermal neutrons impacting the LiF in the trenches react with the lithium (Li) to produce two energetic particles that move in opposite directions. The neutron-lithium reaction releases 4.78 MeV of kinetic energy: 2.05 MeV for an alpha particle and 2.73 MeV for a triton particle, as apportioned by the conservation of momentum. Both particles lose energy as they ionize material along their respective paths, with the generated charge quantities being proportional to the energy deposited. In other words, energetic particles from the neutron-lithium reaction produce ionization in the CZT. The voltage applied between the cathode and anode contacts produces an electric field in the CZT that drives the electrons released by the ionization toward the anode and "holes" toward the cathode.

While the detector can detect both energetic and thermal neutrons, it is more sensitive to thermal neutrons. Thermal neutrons generally have a kinetic energy of less than about 0.5 eV, whereas energetic neutrons generally are considered to have energies of up to thousands or millions of eV (keV or MeV). The sensitivity of the detector provided by the invention generally decreases with increasing neutron energy.

If the thermal neutron cross-section of 6Li is 940 barns (approximately $940 \times 10^{-24}$ cm$^2$) and the density of LiF is 2.635 g/cm$^3$, for fully enriched LiF, the macroscopic capture rate is about 57.5 cm$^{-1}$. Assuming a LiF thickness of 50 µm, the neutron capture efficiency becomes 25.0%. If the LiF-filled trenches occupy half the chip's top surface, the net efficiency is reduced to 12.5%. Our Transport of Ions in Matter (TRIM) calculations show that the path length of the alpha particle is about 7 µm in either LiF or CZT, while that of the triton particle is about 35 µm in either material. Suitable software for performing TRIM calculations, including calculations of energy transfer from a moving ion in a given material, is available from James F. Ziegler, Transport of Ions in Matter, www.srim.org. The calculations also are discussed in the textbook, J. F. Ziegler, J. P. Biersack, & M. D. Ziegler, *SRIM—The Stopping and Range of Ions in Matter*, (James Ziegler, 2008). With trenches 20 µm wide, it is likely that in many events little or no energy from the alpha particle will be deposited in the CZT, but most of the triton's energy will be available to produce a detector signal.

Figure 2:
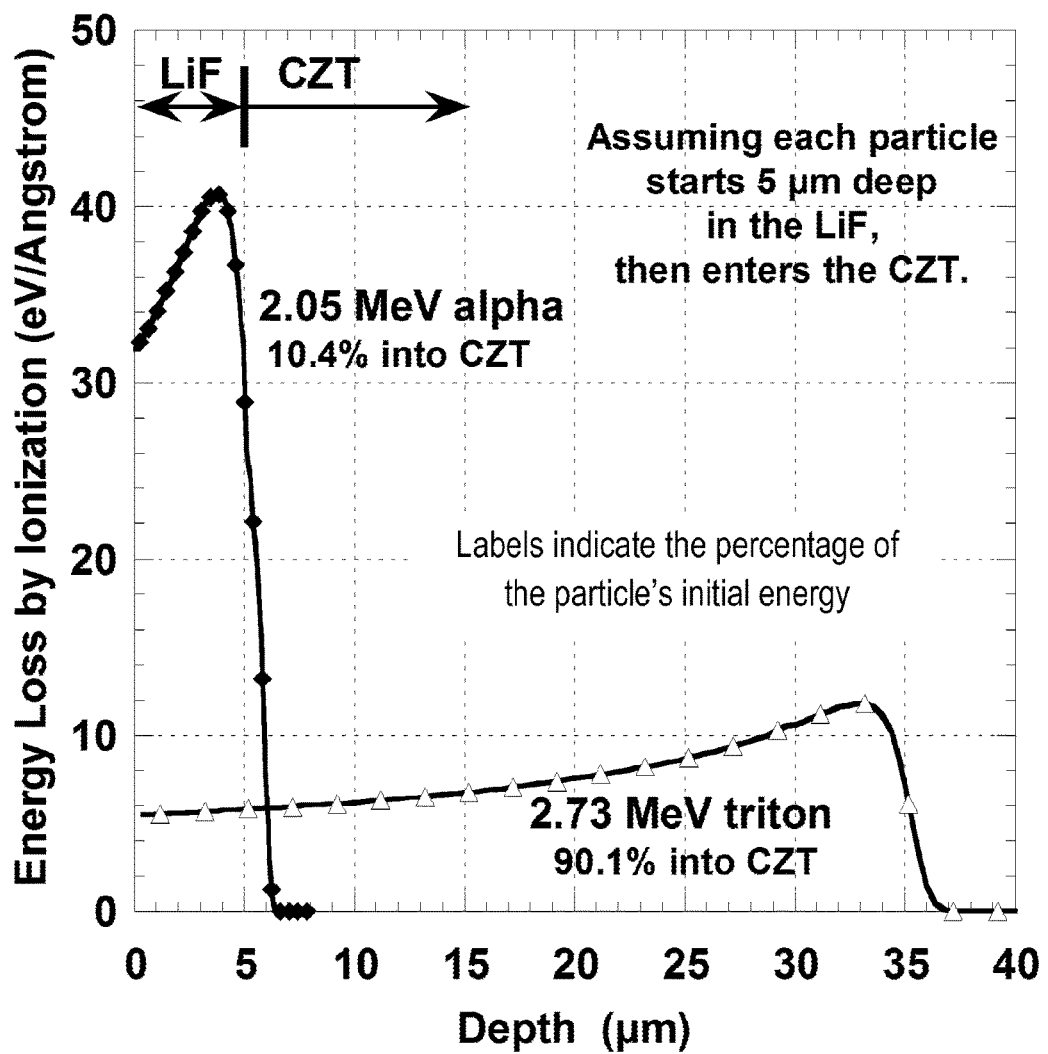
FIG. 2 is a graphical representation of energy loss rate by ionization along the paths of energetic particles from a neutron event, versus distance along their paths. This example assumes that each particle starts about 5 µm deep in a trench of LiF material before entering CZT material in which the trench is formed. Labels on the graph indicate the percentage of the particle's initial energy deposited in the CZT.

FIG. 2 compares the energy generated from an alpha particle and a triton particle, assuming both have to penetrate 5 µm of LiF before reaching the CZT. Plotting energy loss per unit length along the path due to ionization of the material, versus depth, we find that the CZT receives only 10.4% of the alpha's energy but 90.1% of the triton's energy. FIG. 2 graphically shows energy loss rate by ionization along the paths of energetic particles from a neutron-lithium reaction as a function of the distance traveled along their respective paths.

The trenches occupy only 1/40 of the detector chip volume in the illustrated example; the remaining volume (about 1950 µm thick in this example), which functions as a planar detector, provides gamma-ray detection capabilities. To address a well-known problem of hole trapping in CZT, the illustrated anode employs a coplanar grid technique to make the detector chip an electron-only device. The anode consists of two interdigitated grids (grids A and B in FIG. 1) with a potential difference, for example, of 25 V. The difference in the charges appearing on the grids (qA and qB) corresponds to the amplitude of the expected radiation pulse.

The detector chip may further be divided into or otherwise provided as two or more chips, which can be placed in an array to act as individual pixels for an imaging device, for example, or aligned at right angles to one another to enable a degree of directional sensitivity. In an exemplary arrangement, where each chip is about 0.71×0.71×0.2 cm$^3$, the 0.2-cm thickness of the detector chip will require only 200 V to establish an electric field of 1000 V/cm, and will offer a short enough path for electron transport so that electron-trapping losses will be minimal in conventional detector-grade CZT.

In use, neutron events and gamma-ray events in the detector can be distinguished by their pulse characteristics. Neutron events occur within the trenches, in this example within 50 µm of the cathode, and thus exhibit a longer electron-transit time (for example, 200 nsec, assuming a mobility of 1000 cm$^2$ V$^{-1}$ sec$^{-1}$) because their electron clouds generally must transit almost the full 2000 µm thickness of the semiconductor material to the anode. The speed at which the charges move is a function of the size of the semiconductor layer, the material involved, and the voltage drop across the semiconductor layer. In most cases neutron events will have a greater amplitude, however, than gamma-ray events (compare about 1.3 MeV for 60Co gamma rays versus about 2.73 MeV max for triton particles.) The gamma-ray events (except for a small percentage) exhibit a shorter electron-transit time due to their interaction locations, typically closer to the anode. For either type of radiation, given the A and B anode grids, the energy deposited in the detector will be indicated by qA-qB while the electron transit time will be measured by monitoring anode grid A. Each event will thus be characterized by an amplitude (signal magnitude) and an electron transit time.

The controller also can be described as functioning as a pulse height analyzer to generate two pulse height spectra, one for the neutron events and one for the gamma-ray events. This facilitates distinguishing the two kinds of radiation by their electron transit time and pulse amplitude.

Figure 3:
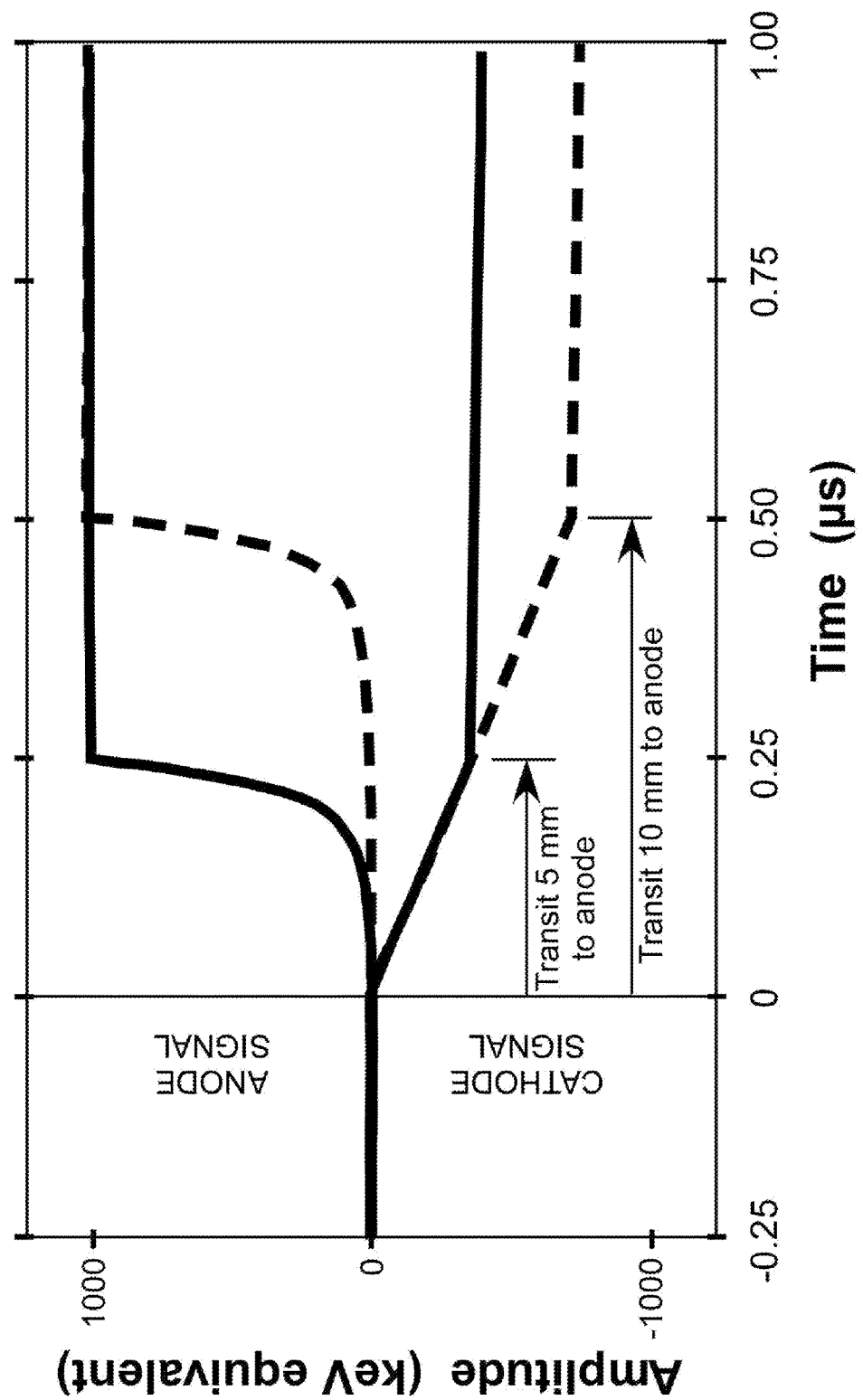
FIG. 3 is an exemplary graphical representation of anode and cathode signal magnitude over time following a neutron or gamma-ray event.

As shown in FIG. 3, the amplitude of the signals received from the cathode (negative) and the anode (positive) over transit time can be graphically illustrated. The cathode signal waveform steadily increases to a maximum amplitude, while the anode signal waveform starts later, and slower at first, before rapidly increasing to a maximum amplitude at about the same time that the cathode waveform reaches its maximum amplitude. After that initial period, the magnitude of each signal waveform reaches a relatively constant value, at their respective maximum amplitude or magnitude. At this point, the signal is no longer changing significantly and levels off, although it may increase or decrease slightly. The delay between the start of the cathode waveform until the maximum value is reached represents the transit time.

To explain further, examples of signals from two gamma-ray detection events are shown in FIG. 3. This illustration assumes the photon energies are 1000 keV and the detector thickness is 15 mm. In the first example (solid curves) the photon is absorbed at time t=0 at a location 5 mm from the anode. The cathode signal shows a linear response beginning at t=0, while the anode signal initially rises more slowly. Then both the cathode and anode signals level off at a time t=0.25 µs, which is the transit time. This is the time necessary for the free electrons to drift from the location of the gamma-ray capture, where they were generated, to the anode, where they are collected. In the second example (dashed curves) the photon is again absorbed at time t=0, but at a location 10 mm from the anode. The transit time is 0.50

μs. These examples illustrate how a measurement of the transit time will reveal the depth in the detector at which the gamma ray was absorbed.

The difference in shape between the cathode and anode signals in FIG. 3 is a consequence of the anode configuration. The cathode is a large area metal contact on the negative-biased face of the detector. In contrast, the anode, to which a positive voltage is applied, is divided into many small areas. One choice for the anode design is the interdigitated coplanar grids formed by the metal stripes A and B shown in FIG. 1. Each pixel of the detector array has its own pair of A and B grids. Another anode design choice places a single metal contact within each pixel having a small size relative to the pixel area (known as the small-pixel method).

In either anode design the anode configuration causes the electric field within the CZT volume near the anode to be nonuniform. The effect can be described in terms of weighting potentials according to the Shockley-Ramo theorem. The result is that the moving electrons contribute very little to the anode signal when they are far from the anode, but as they approach the anode their contribution to the anode signal increases rapidly. This produces the curvature followed by the rapid rise seen in the anode signals in FIG. 3. The moment at which the cathode signal begins its linear ramp marks the start of the electron transit time, and the moment at which the anode signal levels off serves as a convenient indicator of the end of the electron transit time.

An alternative method for determining the depth of interaction is to consider the ratio of the final cathode signal to the final anode signal. As seen with the two examples in FIG. 3, both anode signals exhibit the same final value, but the final cathode signals are different. The longer transit to the anode (in the 10 mm example) results in a larger final signal at the cathode. Thus the cathode-to-anode final signal ratio reveals the depth of interaction at which the gamma ray was absorbed.

The preceding discussion explains two practical methods for determining the electron transit time in the detector. Other methods can be envisioned. While the present invention is described using the electron transit time, the invention is not confined to any particular method of determining the electron transit time.

Neutron events can be distinguished from gamma-ray events by their depth of interaction. The energy released upon capture of a neutron will occur within 50 μm (0.05 mm) of the cathode because of the placement of the neutron-sensitive $^6$Li material. Events occurring at other depths can be presumed to indicate gamma-ray events.

Criteria that can be used by the controller to distinguish gamma-ray events from neutron events can be predetermined and saved in memory for use by the processor. For example, the magnitude of the anode signal generally will be greater than the magnitude of the cathode signal. Accordingly, the signal amplitude ratio of the magnitude (amplitude) of the cathode signal to the magnitude of the anode signal will fall within a range between zero (indicating an event occurring nearer the anode, typically a gamma-ray event in the illustrated exemplary detector) and one (indicating an event occurring nearer the cathode, more often a neutron event). Thus the signal amplitude ratio can be one factor to consider, and a value can be determined empirically that would define a line of demarcation between events that are more likely to be neutron events and events that are more likely to be gamma-ray events. That value can be predetermined, empirically, for example, and stored in a memory as one criteria to be used in distinguishing the radiation events.

The anode signal for neutron events also will be greater than the anode signal for gamma-ray events. Once again, a threshold value, which defines a line of demarcation between neutron events and gamma-ray events, can be predetermined and stored in memory for use by the controller in sorting the events. Similarly, a threshold value or values for the expected transit time for neutron and gamma ray events, respectively, can be compared against a predetermined value stored in memory for use by the controller.

In summary then, the present invention provides a method for detecting both gamma-ray events and neutron events with a common detector, where the detector includes a layer of semiconductor material bounded by electrodes, and the electrodes include an anode on one side of the semiconductor material and a cathode on the other side of the semiconductor material. The method includes the following steps: (a) monitoring the electrical signal at each of the anode and the cathode; and (b) comparing the magnitude of the signals at the anode and the cathode, and the transit time difference between the start of the anode signal and the time when the anode signal reaches a maximum, relatively constant value. In the comparing step, predetermined criteria are used to differentiate between gamma-ray events and neutron events.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

What is claimed is:

1. A method for detecting both gamma-ray events and neutron events with a detector, the detector having a detector body composed of a semiconductor material bounded by electrodes, including an anode on one side of the semiconductor material and a cathode on the other side of the semiconductor material, and one or more trenches formed in a side of the semiconductor material adjacent the cathode, the trenches containing a neutron-capturing material, the method comprising the steps of:

monitoring the electrical signal at each of the anode and the cathode; and comparing both the magnitude of the electrical signals at the anode and the cathode, and a transit time difference of at least 0.25 microseconds between a start of the electrical signal at the anode and a time when the electrical signal at the anode reaches a constant value, to differentiate between gamma-ray events and neutron events based on predetermined criteria; where the comparing step includes comparing the magnitude of the signal at the cathode to a predetermined value representing a depth of the neutron-capturing material in the one or more trenches.

2. A method as set forth in claim 1, where the comparing step includes using the magnitude of the cathode signal to measure the depth of the gamma-ray event or of the neutron event in the semiconductor material.

3. A method as set forth in claim 1, where the comparing step includes comparing the magnitude of the signal at the anode when it reaches a constant value to a predetermined value.

4. A method as set forth in claim 1, where the comparing step includes calculating a signal amplitude ratio of the magnitude of the cathode signal to the magnitude of the anode signal, and comparing the signal amplitude ratio to a predetermined value.

5. A method as set forth in claim 1, comprising the step of applying an electric field across the semiconductor material.

6. A method as set forth in claim 1, including the step of providing a gamma-ray and neutron detector having a controller connected to the anode and the cathode, the controller including a processor and a memory.

7. A device for detecting both gamma rays and neutrons, comprising:
   an anode;
   a cathode;
   a processor connected to the anode and the cathode;
   a semiconductor layer interposed between the anode and the cathode, the semiconductor layer including a semiconductor material suitable for capturing gamma-ray events, the semiconductor material having generally parallel planar faces and a plurality of trenches in one of the planar faces adjacent to and between segments of one of the cathode and the anode, the trenches containing a material suitable for capturing neutron events;
   where the processor is configured to cooperate with the anode and the cathode to apply an electric field across the semiconductor layer; and the processor is configured to differentiate between signals generated by a neutron event and signals generated by a gamma-ray event as a function of a transit time and a magnitude of signals received from each of the anode and the cathode; and
   where the semiconductor material has a thickness of about 2000 micrometers (μm), and the trenches have a depth of about 50 micrometers (μm), a width of about 20 micrometers (μm), and a spacing of about 20 micrometers (μm).

8. A device as set forth in claim 7, where the processor includes an analog-to-digital signal processor.

9. A device as set forth in claim 7, where the semiconductor material includes crystallized cadmium-zinc-telluride (CdZnTe).

10. A device as set forth in claim 7, where the neutron-capturing material includes lithium fluoride.

11. A device as set forth in claim 7, where the cathode is disposed adjacent both the semiconductor material and the neutron-capturing material, and the anode is disposed adjacent only the semiconductor material.

12. A device as set forth in claim 7, further comprising a passivation layer disposed in the trenches separating the semiconductor material from the neutron-capturing material.

13. A device as set forth in claim 12, where the passivation layer is a layer of oxidized crystallized cadmium-zinc-telluride (CdZnTe).

14. A device as set forth in claim 7, where the anode includes interdigitated grids of coplanarly arranged anode material.

\* \* \* \* \*